(12) United States Patent
Gagliano

(10) Patent No.: US 8,267,383 B2
(45) Date of Patent: Sep. 18, 2012

(54) MOUNT DEVICES AND METHODS FOR MEASURING FORCE

(75) Inventor: Charles J. Gagliano, Hilliard, OH (US)

(73) Assignee: Honda Motor Company, Ltd., Tokyo (JP)

( * ) Notice: Subject to any disclaimer, the term of this patent is extended or adjusted under 35 U.S.C. 154(b) by 1086 days.

(21) Appl. No.: 12/180,576

(22) Filed: Jul. 28, 2008

(65) Prior Publication Data

US 2010/0019424 A1 Jan. 28, 2010

(51) Int. Cl.
 *F16F 5/00* (2006.01)
(52) U.S. Cl. ........... 267/140.11; 267/140.15; 267/141.3; 267/141.5
(58) Field of Classification Search ........... 267/140.11–140.15, 141.3–141.5; 73/862.041, 862.045
 See application file for complete search history.

(56) References Cited

U.S. PATENT DOCUMENTS

| | | | |
|---|---|---|---|
| 2,256,752 A * | 9/1941 | Saurer | 267/141.5 |
| 3,365,689 A | 1/1968 | Kutsay | |
| 4,046,415 A | 9/1977 | Klees et al. | |
| 4,112,751 A | 9/1978 | Grunbaum | |
| 4,281,539 A * | 8/1981 | Keller | 73/862.632 |
| 4,700,934 A * | 10/1987 | Andra et al. | 267/140.12 |
| 4,800,751 A | 1/1989 | Kobayashi et al. | |
| 5,058,867 A * | 10/1991 | Hadano et al. | 267/141.3 |
| 5,127,277 A | 7/1992 | Forrester et al. | |
| 5,154,403 A * | 10/1992 | Sato | 267/141.2 |
| 5,172,893 A * | 12/1992 | Bouhier et al. | 267/140.12 |
| 5,503,030 A | 4/1996 | Bankestrom | |
| 5,609,353 A * | 3/1997 | Watson | 280/5.516 |
| 5,847,290 A | 12/1998 | Kim | |
| 5,927,699 A * | 7/1999 | Nakajima et al. | 267/140.14 |
| 2004/0130442 A1* | 7/2004 | Breed et al. | 340/443 |
| 2005/0192727 A1* | 9/2005 | Shostak et al. | 701/37 |

* cited by examiner

*Primary Examiner* — Bradley King
*Assistant Examiner* — Mahbubur Rashid
(74) *Attorney, Agent, or Firm* — Ulmer & Berne LLC

(57) ABSTRACT

Devices and methods are provided to facilitate measurement of forces acting on locations connecting a subframe portion and a body portion of a vehicle, such devices and methods include mount devices having an inner member, an outer member, at least one sensor, a sleeve and an annular member. The sensor is disposed within an annular chamber formed between the inner member and the outer member. The sensor is attached to at least one of the inner member and the outer member. The sensor is configured to measure force exerted on the mount device during use of a vehicle. Vehicles including these mount devices are also provided.

17 Claims, 5 Drawing Sheets

MOUNT DEVICES AND METHODS FOR MEASURING FORCE

TECHNICAL FIELD

Devices and methods are provided to facilitate measurement of forces exerted on locations between a subframe and a body of a vehicle.

BACKGROUND

Conventional mount devices are designed to optimize handling, noise and ride comfort of a vehicle. The conventional mount devices are typically constructed of solid rubber with a metal or plastic inner collar. Such mount devices achieve varying degrees of success in addressing phenomena such as vehicle handling, noise and ride comfort. These mount devices have typically been selected for a particular vehicle through a process of trial and error. Force determination methods for use in designing and selecting mount device configurations for a particular vehicle presently involve use of inversion techniques which are based upon measurements on surrounding components. Accordingly, selecting and tuning a mount device for a specific vehicle can be time and cost intensive.

SUMMARY

In accordance with one embodiment, a mount device comprises an inner member, an outer member, at least one sensor, a sleeve and an annular member. The inner member and the outer member form an annular chamber disposed therebetween. The inner member and the outer member are concentrically arranged with respect to each other. The inner member is configured to attach to a vehicle. The at least one sensor is disposed within the annular chamber and is attached to at least one of the inner member and the outer member. The at least one sensor is configured to measure force exerted on the mount device during use of a vehicle. The sleeve is configured to attach to a vehicle. The annular member is disposed between the outer member and the sleeve. The annular member is configured to provide support to the outer member with respect to the sleeve. The annular member contacts the outer member along an exterior surface of the outer member.

In accordance with another embodiment, a vehicle comprises a body portion, a subframe portion, and at least one mount device. The mount device comprises an inner member, an outer member, at least one sensor, a sleeve and an annular member. The inner member and the outer member form an annular chamber disposed therebetween. The inner member and the outer member are concentrically arranged with respect to each other. The inner member is configured to attach to one of the body portion and the subframe portion of the vehicle. The at least one sensor is disposed within the annular chamber and attached to at least one of the inner member and the outer member. The at least one sensor is configured to measure force exerted on the mount device during use of the vehicle. The sleeve is configured to attach to another one of the body portion and the subframe portion of the vehicle. The annular member is disposed between the outer member and the sleeve. The annular member is configured to provide support to the outer member with respect to the sleeve. The annular member contacts the outer member along an exterior surface of the outer member. The at least one mount device attaches the body portion to the subframe portion of the vehicle.

In accordance with yet another embodiment, a method is provided for determining force exerted on a mount device of a vehicle. The method comprises attaching a mount device to a vehicle, operating the vehicle, and monitoring the at least one sensor during operation of the vehicle. The mount device comprises an inner member, an outer member, at least one sensor, a sleeve and an annular member. The inner member and the outer member form an annular chamber disposed therebetween. The inner member and the outer member are concentrically arranged with respect to each other. The inner member is configured to attach to the vehicle. The at least one sensor is disposed within the annular chamber and is attached to at least one of the inner member and the outer member. The at least one sensor is configured to measure force exerted on the mount device. The sleeve is configured to attach to the vehicle. The annular member is disposed between the outer member and the sleeve. The annular member is configured to support the outer member with respect to the sleeve. The annular member contacts the outer member along an exterior surface of the outer member.

BRIEF DESCRIPTION OF THE DRAWINGS

While the specification concludes with claims particularly pointing out and distinctly claiming the invention, it is believed that the same will be better understood from the following description taken in conjunction with the accompanying in which:

DETAILED DESCRIPTION

Figure 1:
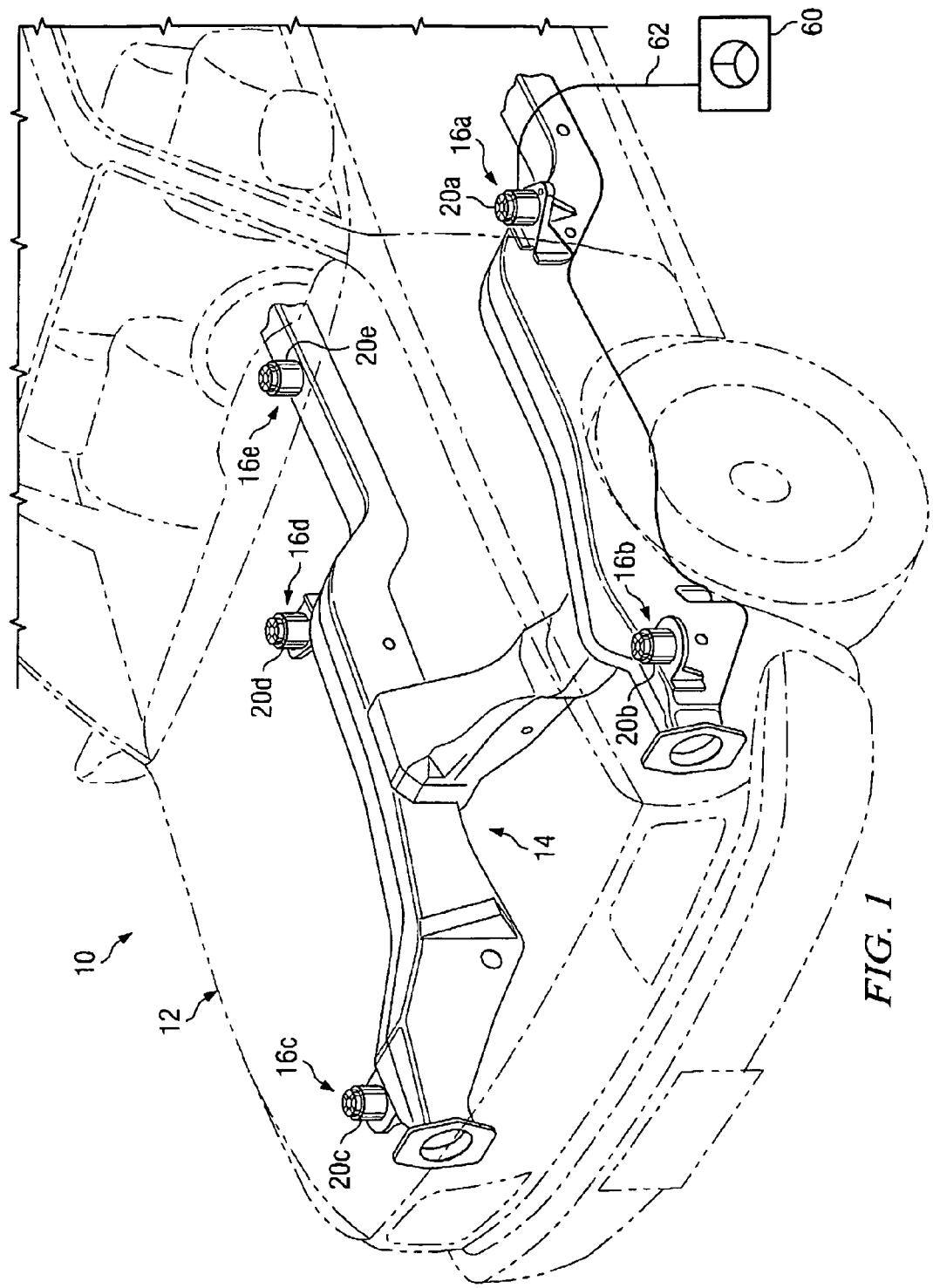
FIG. 1 illustrates a perspective view of a vehicle and a feedback device in accordance with one embodiment.
Figure 2:
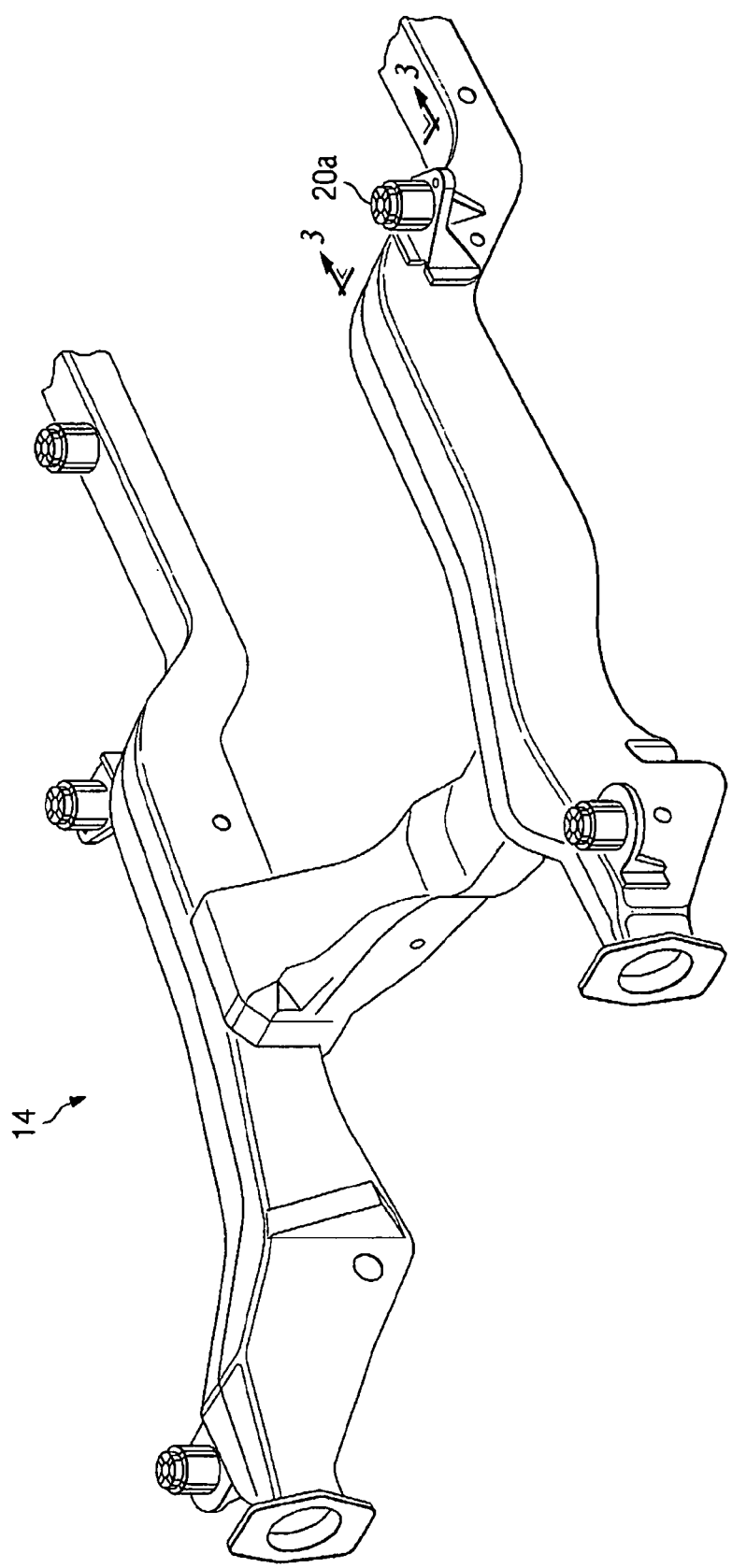
FIG. 2 illustrates a subframe portion of the vehicle of FIG. 1.

Embodiments are herein described in detail in connection with the drawings of FIGS. 1-6, wherein like numbers indicate the same or corresponding elements throughout the drawings. As illustrated in the embodiment of FIG. 1, a vehicle 10 (e.g. an automobile) can include a body portion 12 and a subframe portion 14. While the vehicle illustrated in FIG. 1 represents an automobile, it is contemplated that such vehicle can alternatively comprise any of a variety of other types of vehicles, such as, for example, a truck, a van, a recreational vehicle, an all terrain vehicle, a utility vehicle, an aircraft, agricultural equipment, or construction equipment.

As illustrated in the embodiment shown in FIG. 1, the subframe portion 14 can attach to the body portion 12 of the vehicle 10 at multiple locations (e.g., 16a, 16b, 16c, 16d, and 16e) through use of mount devices (e.g., 20a, 20b, 20c, 20d, and 20e) provided at some or all of those locations. The location and quantity of mount devices can vary depending upon the type of vehicle, and upon the design and overall structure of the body portion and the subframe portion of the vehicle. Also, it will be appreciated that mount devices can be configured to attach a subframe portion to a body portion of a vehicle in any of a variety of arrangements to accommodate different arrangements of body portions and subframe portions as may be provided upon different vehicles, for example, the mount devices (e.g., 20a, 20b, 20c, 20d, and 20e) can be positioned substantially vertically so as to attach the subframe portion 14 to the body portion 12 of the vehicle 10 as generally represented in FIG. 1. However, mount devices can alternatively be positioned substantially horizontally or at any of a variety of angles in order to facilitate attachment of a subframe portion to a body portion of a vehicle. It will be appreciated that mount devices can alternatively be used to attach other portions of a vehicle (e.g., as an engine mount). It will be appreciated that a mount device can reduce vibration and absorb forces acting between portions of a vehicle attached together by the mount device.

Figure 3:
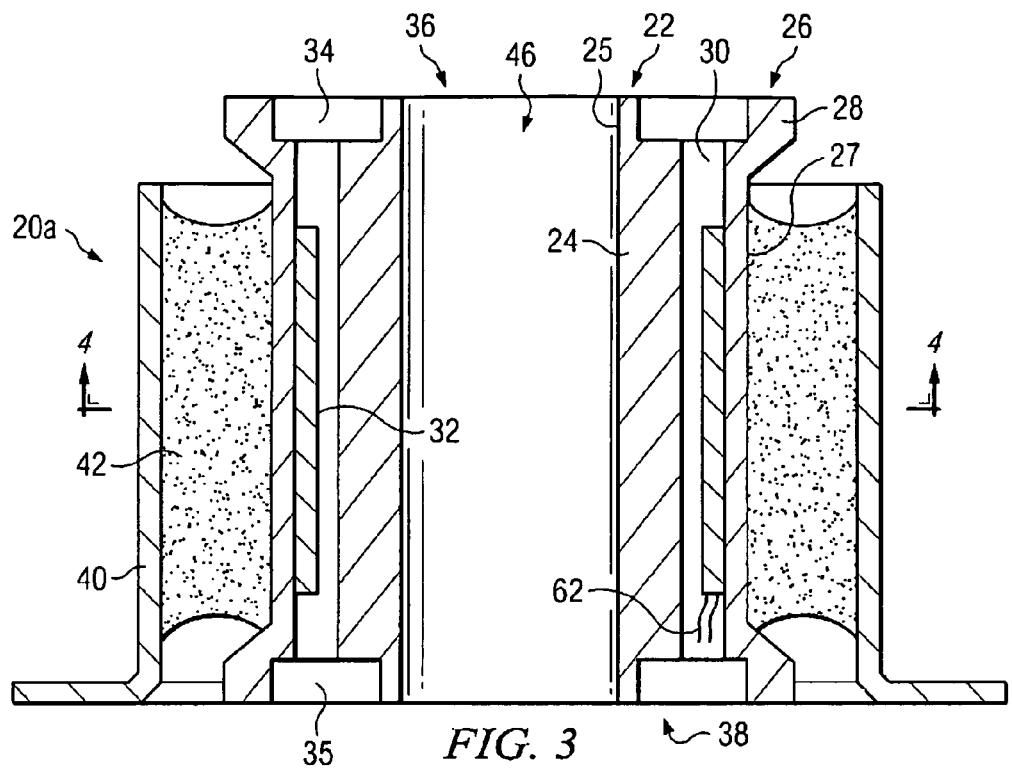
FIG. 3 illustrates a cross-sectional view of a mount device taken along section line 3-3 of FIG. 2.

FIG. 3 illustrates a cross-sectional view of the mount device 20a. It will be appreciated that other mount devices (e.g., 20b, 20c, 20d, and 20e) of the vehicle 10 can have a similar configuration to mount device 20a, or can alternatively have any of a variety of other suitable configurations. The mount device 20a is shown to include an inner member 22 having a circumferential wall 24 which is at least partially concentrically surrounded by an outer member 26 having a circumferential wall 28. The circumferential wall 24 of the inner member 22 has an interior surface 25 and the circumferential wall 28 of the outer member 26 has an exterior surface 27. The inner member 22 and the outer member 26 can have substantially round configurations. However, it will be understood that the configuration of the inner member and the outer member of a mount device can have alternative configurations, including, for example, rectangular configurations.

In the embodiment illustrated in FIG. 3, an annular chamber 30 is formed between the inner member 22 and the outer member 26. As illustrated in FIG. 3, the annular chamber 30 is configured to house a sensor (e.g. strain gauge 32). The inner member 22 and the outer member 26 can be connected. For example, a first washer 34 is shown to be provided at an upper end 36 of the mount device 20a, while a second washer 35 is shown to be provided at a lower end 38 of the mount device 20a. In other embodiments, washers and/or other fasteners can be provided to connect inner and outer members of a mount device in any of a variety of alternative configurations.

Figure 4:
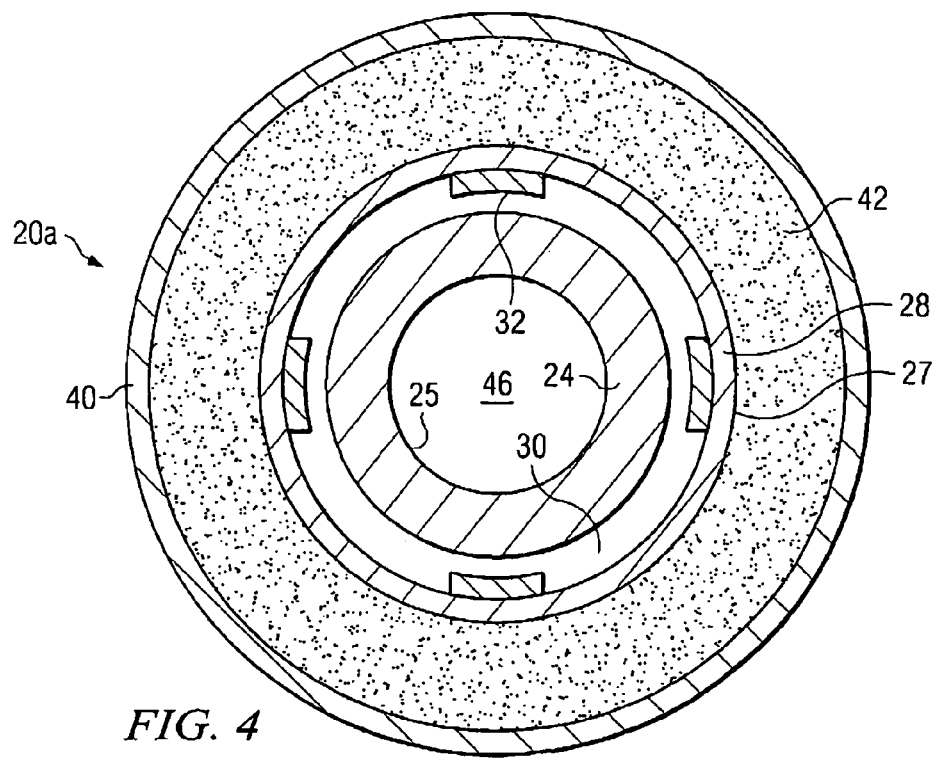
FIG. 4 illustrates a cross-sectional view of the mount device of FIG. 3 taken along section line 4-4 of FIG. 3.
Figure 5:
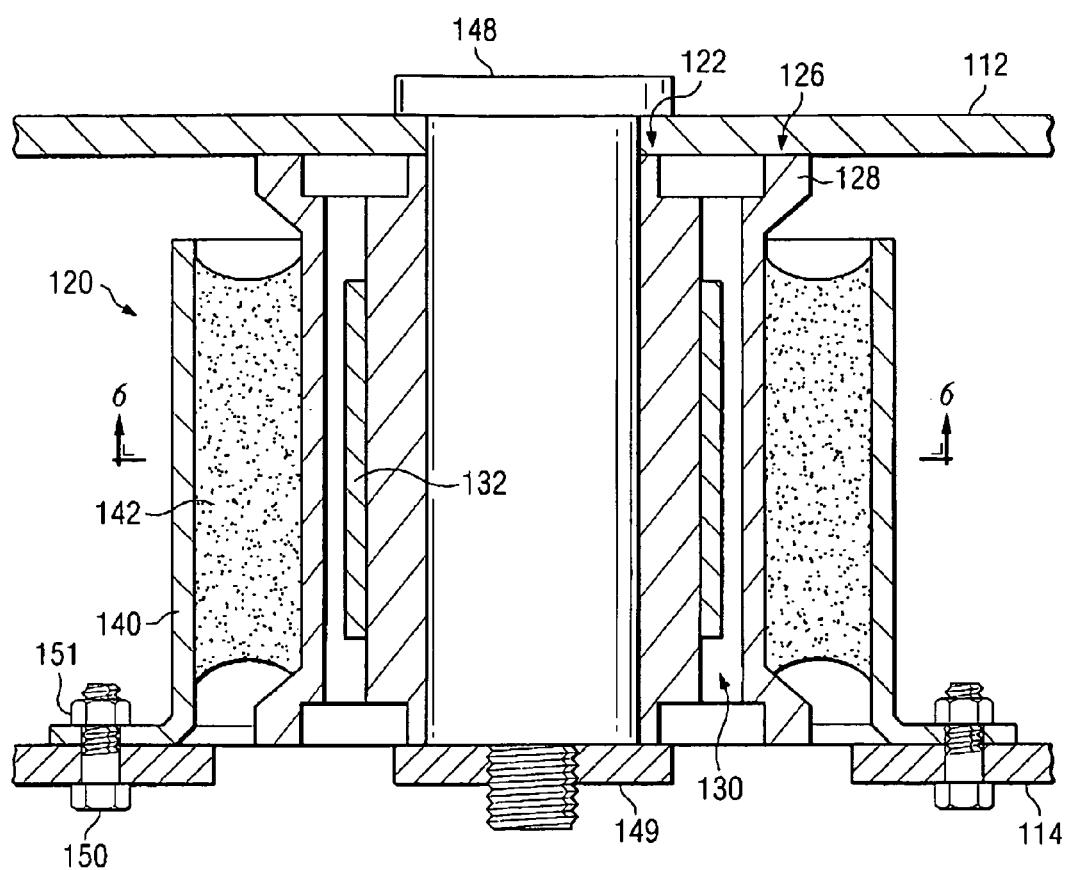
FIG. 5 illustrates a cross-sectional view of a mount device in accordance with another embodiment, and in association with a body portion and a subframe portion of a vehicle.
Figure 6:
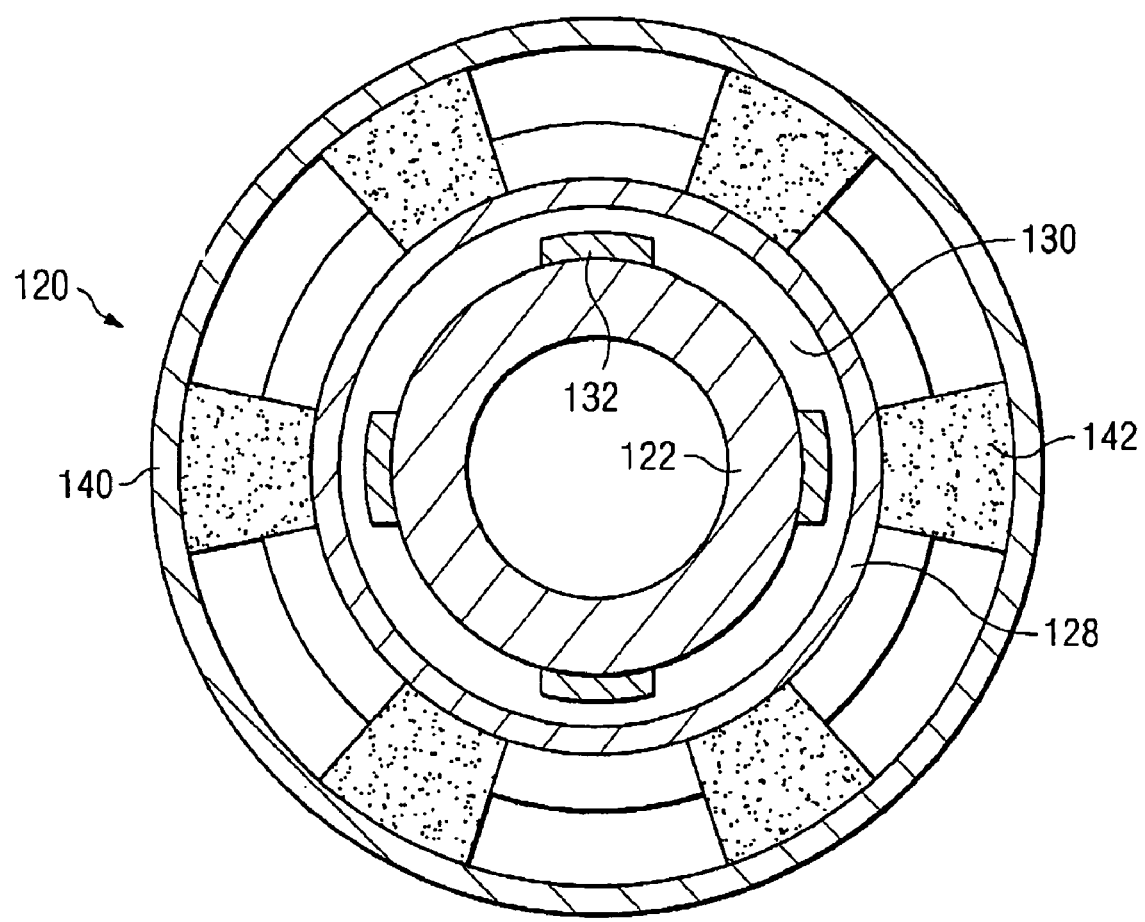
FIG. 6 illustrates a cross-sectional view of the mount device of FIG. 5 taken along section line 6-6 of FIG. 5, and apart from the other components of FIG. 5.

As further illustrated in the embodiment of FIG. 3, the mount device 20a includes a sleeve 40 which surrounds the outer member 26 in a generally concentric manner. An annular member 42 is shown to be disposed between the sleeve 40 and the exterior surface 27 of the wall 28 of the outer member 26. In one embodiment, the annular member 42 can be compressed against the outer member 26 by the sleeve 40, thereby securing the outer member 26 with respect to the sleeve 40. The annular member 40 can be made of a resilient material, such as rubber. However, it is contemplated that any of a variety of materials can alternatively be used in forming the annular member 42. As shown in FIG. 4, the annular member 42 extends continuously about the circumference of the wall 28 of the outer member 26. In an alternative embodiment, as shown in FIGS. 5-6, an annular member 142 of a mount device 120 might not continuously extend about the circumference of a wall 128 of an outer member 126, but might rather include multiple arms which extend radially from the wall 128 to a sleeve 140. It will be appreciated that an outer member can be supported by a sleeve via an annular member in any of a variety of alternative arrangements.

In one embodiment, a sleeve of a mount device can be attached to the subframe portion of a vehicle. For example, as shown in FIG. 5, bolls 150 and nuts 151 can be used to attach the sleeve 140 of the mount device 120 to a subframe portion 114 of a vehicle. The mount device can also be attached to a body portion of the vehicle. For example, to facilitate connection of the mount device 20a to the body portion 12, the inner member 22 can define an inner opening 46 (as shown in FIG. 3) configured to receive a fastener and/or a part of the body portion 12. As shown in FIG. 5, a bolt 148 and nut 149 can be used to secure a body portion 112 to the mount device 120. In an alternative embodiment, the sleeve of a mount device can attach to the body portion of a vehicle, and an aperture in an inner member of the mount device can facilitate attachment of the mount device to a subframe portion of the vehicle. It will be appreciated that any of a variety of fasteners, adhesives, welding, and/or other devices or techniques can be used to attach parts of a mount device to a body portion and/or a subframe portion of a vehicle.

During operation of the vehicle, forces placed upon the body portion and the subframe portion of the vehicle can act upon a mount device and can be transmitted to one or more sensors (e.g., strain gauges) provided within the mount device. For example, as shown in FIG. 3, a strain gauge 32 can be provided in the annular chamber 30, attached to the outer member 26, and spaced from the inner member 22. In an alternative embodiment, as illustrated in FIG. 5, a strain gauge 132 can be disposed within an annular chamber 130, attached to an inner member 122, and spaced from the outer member 126. The strain gauges 32, 132 illustrated in FIGS. 3 and 5 can be configured to deform in shape and thus measure force placed upon the mount devices 20a, 120 through interaction of vehicle components (e.g. the body portion and the subframe portion) attached to the mount devices 20a, 120. Though a mount device might include only a single strain gauge, it will be appreciated that a mount device might alternatively include multiple strain gauges. For example, the mount devices 20a, 120 of FIGS. 4 and 6 are each shown to include lour strain gauges. Also, it will be appreciated that strain gauges can be disposed in a mount device in any of a variety of suitable orientations including, for example, horizontally, vertically, and/or diagonally.

In one embodiment, forces transmitted between the inner member and the outer member deform one or more strain gauges of a mount device, and thus allow for measurement of the associated forces placed upon the mount device. Each strain gauge can output identifiable signals indicative of the forces (e.g., voltages proportional to the lateral forces) acting on the mount device. These voltages or other signals can be measured or otherwise monitored during operation of the vehicle such that the nature and magnitude of the forces acting upon the mount device can be identified. For example, with reference to FIGS. 1 and 3, the strain gauge(s) 32 of a mount device 20a can be in communication with a feedback device 60 via one or more wires 62 to provide data associated with forces placed upon the mount device 20a. It will be appreciated that communication between a strain gauge and feedback device can be achieved through use of a variety of alternative methods including, for example, wireless, RFID, RF and/or a variety of oilier techniques. A feedback device can comprise a monitor, meter, computer and/or any other device which can monitor and/or measure responses provided by a sensor. A feedback device can be located within a vehicle or can be located remotely from a vehicle for both testing and real lime use. Once the forces acting upon a mount device are determined, a designer can select an optimal mount device configuration for use upon that particular vehicle, and without need of conducting extensive trial and error testing.

A mount device can accordingly be capable of providing and facilitating the measurement of forces acting upon the mount device as it is used in any of the particular locations in which it can be provided upon a vehicle, such as relative to a subframe portion and a body portion of the vehicle. One or more mount devices can be used at one location or at multiple locations in the vehicle so that the amount of force can be measured and monitored at one particular location, or at multiple locations as desired. An advantage of providing such a system allows a vehicle designer to efficiently select a mount device which optimizes comfort, reduces noise, reduces vibration, and provides an overall enhanced structural stability of a vehicle during use. In addition to providing a system to select a mount device, it will be appreciated that a mount device as discussed herein can be permanently attached to a vehicle to facilitate continuous monitoring of forces by control systems present upon the vehicle (e.g. an engine control unit). Also, having such a mount device permanently provided within a vehicle can provide information to the user (or a mechanic) relating to alignment issues, cracks in the frame, suspension performance, and/or a variety of other characteristics.

The foregoing description of embodiments and examples has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate certain principles and various embodiments as are suited to the particular use contemplated. The scope of the invention is, of course, not limited to the examples or embodiments set forth herein, but can be employed in any number of applications and equivalent devices by those of ordinary skill in the art. Rather, it is hereby intended the scope of the invention be defined by the claims appended hereto.

What is claimed is:

1. A mount device comprising: an inner member and an outer member forming an annular chamber disposed therebetween, wherein the inner member and the outer member are concentrically arranged with respect to each other, and wherein the inner member is configured to attach to a vehicle;
   a plurality of sensors, the sensors being circumferentially spaced within the annular chamber and attached to at least one of the inner member and the outer member, wherein each of the sensors is configured to measure force exerted on the mount device during use of a vehicle;
   a sleeve configured to attach to a vehicle; and
   an annular member disposed between the outer member and the sleeve, the annular member configured to provide support to the outer member with respect to the sleeve, wherein the annular member contacts the outer member along an exterior surface of the outer member; wherein
   the annular member comprises a resilient material.

2. The mount device according to claim 1, wherein the annular member comprises rubber.

3. The mount device according to claim 1, wherein the annular member extends continuously about a circumference of the outer member.

4. The mount device according to claim 1, wherein the annular member extends discontinuously about a circumference of the outer member.

5. The mount device according to claim 1, wherein each of the sensors comprises a strain gauge.

6. The mount device according to claim 5, wherein each of the strain gauges is attached to the inner member.

7. The mount device according to claim 6, wherein each of the strain gauges is spaced from the outer member.

8. The mount device according to claim 5, wherein each of the strain gauges is attached to the outer member.

9. The mount device according to claim 8, wherein each of the strain gauges is spaced from the inner member.

10. A vehicle comprising:
    a body portion;
    a subframe portion; and
    at least one mount device comprising:
    an inner member and an outer member forming an annular chamber disposed therebetween, wherein the inner member and the outer member are concentrically arranged, and connected in a fixed relationship, with respect to each other, and wherein the inner member is configured to attach to one of the body portion and the subframe portion of the vehicle;
    at least one sensor disposed within the annular chamber and attached to at least one of the inner member and the outer member, wherein the at least one sensor is configured to measure force exerted on the mount device during use of the vehicle;
    a sleeve configured to attach to another one of the body portion and the subframe portion of the vehicle; and
    an annular member disposed between the outer member and the sleeve, the annular member configured to provide support to the outer member with respect to the sleeve, wherein the annular member contacts the outer member along an exterior surface of the outer member; and
    wherein the at least one mount device attaches the body portion to the subframe portion of the vehicle.

11. The vehicle of claim 10, wherein the at least one mount device comprises a plurality of the mount devices.

12. The vehicle according to claim 10, wherein the at least one sensor comprises a strain gauge.

13. The vehicle according to claim 12, wherein the strain gauge is attached to the inner member.

14. The vehicle according to claim 12, wherein the strain gauge is attached to the outer member.

15. A method of determining force exerted on a mount device of a vehicle, the method comprising:
    attaching a mount device to a vehicle, the mount device comprising:
    an inner member and an outer member forming an annular chamber disposed therebetween, wherein the inner member and the outer member are concentrically arranged with respect to each other, and wherein the inner member is configured to attach to the vehicle;
    a plurality of sensors, the sensors being circumferentially spaced within the annular chamber and attached to at least one of the inner member and the outer member, wherein each of the sensors is configured to measure force exerted on the mount device;
    a sleeve configured to attach to the vehicle; and
    an annular member disposed between the outer member and the sleeve, the annular member configured to support the outer member with respect to the sleeve, wherein the annular member comprises a resilient material and contacts the outer member along an exterior surface of the outer member;
    operating the vehicle; and
    monitoring each of the sensors during operation of the vehicle.

16. The method according to claim 15, wherein attaching the mount device comprises attaching the inner member to the body portion of the vehicle and attaching the sleeve to a subframe portion of the vehicle.

17. The method according to claim 15, wherein monitoring each of the sensors comprises providing each of the sensors in communication with a feedback device.

* * * * *

UNITED STATES PATENT AND TRADEMARK OFFICE
CERTIFICATE OF CORRECTION

PATENT NO. : 8,267,383 B2  
APPLICATION NO. : 12/180576  
DATED : September 18, 2012  
INVENTOR(S) : Charles J. Gagliano Page 1 of 1

It is certified that error appears in the above-identified patent and that said Letters Patent is hereby corrected as shown below:

Title Page, item (74), change "Ulmer & Berne LLC" to --Ulmer & Berne LLP--;
Column 2, line 50, change "e.g." to --e.g.,--;
Column 3, line 2, change "vehicles, for" to --vehicles. For--;
Column 3, line 35, change "e.g." to --e.g.,--;
Column 3, line 67, change "bolls" to --bolts--;
Column 4, line 27, change "e.g." to --e.g.,--;
Column 4, line 33, change "lour" to --four--;
Column 4, line 54, change "oilier" to --other--;
Column 4, line 59, change "lime" to --time--; and
Column 5, line 8, change "e.g." to --e.g.,--.

Signed and Sealed this  
Thirtieth Day of October, 2012

David J. Kappos  
*Director of the United States Patent and Trademark Office*